(12) United States Patent
Atsumi et al.

(10) Patent No.: US 11,459,033 B2
(45) Date of Patent: Oct. 4, 2022

(54) BODY OF VEHICLE

(71) Applicants: TOYOTA JIDOSHA KABUSHIKI KAISHA, Aichi (JP); SUBARU CORPORATION, Tokyo (JP)

(72) Inventors: Hyuga Atsumi, Nagoya (JP); Osamu Shimasaki, Nisshin (JP); Shunsuke Takii, Aichi-ken (JP); Satoshi Ikeda, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 29 days.

(21) Appl. No.: 17/148,576

(22) Filed: Jan. 14, 2021

(65) Prior Publication Data

US 2021/0237801 A1 Aug. 5, 2021

(30) Foreign Application Priority Data

Feb. 5, 2020 (JP) .............................. JP2020-018256

(51) Int. Cl.
| | | |
|---|---|---|
| *B62D 21/15* | (2006.01) | |
| *B62D 25/08* | (2006.01) | |
| *B62D 27/02* | (2006.01) | |
| *B60R 19/34* | (2006.01) | |
| *B60K 1/04* | (2019.01) | |

(52) U.S. Cl.
CPC ............ *B62D 21/152* (2013.01); *B60R 19/34* (2013.01); *B62D 27/02* (2013.01); *B60K 1/04* (2013.01); *B62D 25/085* (2013.01)

(58) Field of Classification Search
CPC ...... B62D 21/15; B62D 21/152; B62D 25/08; B62D 25/085; B62D 27/02; B60R 19/02; B60R 19/34; B60R 2019/1806; B60K 1/00; B60K 1/04; B60K 2001/0411

USPC ............. 296/187.1, 187.09, 193.09, 203.01; 293/132, 133
See application file for complete search history.

(56) References Cited

U.S. PATENT DOCUMENTS

| | | | | |
|---|---|---|---|---|
| 9,308,940 | B1 * | 4/2016 | Malavalli | ............ B62D 25/082 |
| 2019/0300059 | A1 * | 10/2019 | Komiya | ................ B62D 21/00 |
| 2020/0114747 | A1 * | 4/2020 | Lian | .................... B62D 25/145 |

FOREIGN PATENT DOCUMENTS

| | | | | |
|---|---|---|---|---|
| FR | 3078047 A1 * | 8/2019 | ............ B60R 19/04 |
| JP | 201120627 A | 2/2011 | |
| JP | 202015356 A | 1/2020 | |

OTHER PUBLICATIONS

Coiffier et al., "Shifting a Diverter Associated With an Absorber for Responding a Frontal Impact Small Overlap", Aug. 23, 2019, Publisher: European Patent Office, Edition: FR 3078047 A1 (Year: 2019).*

* cited by examiner

*Primary Examiner* — Dennis H Pedder
*Assistant Examiner* — Joyce Eileen Hill
(74) *Attorney, Agent, or Firm* — Hauptman Ham, LLP

(57) ABSTRACT

A body of a vehicle may include: a pair of front side members extending along a front-rear direction of the vehicle; a crossmember connecting the front side members to each other; a pair of gussets, each of the gussets being joined to an outer lateral surface of corresponding one of the front side members; a pair of crash boxes, each of the crash boxes being provided frontward of corresponding one of protrusions; and a bumper reinforcement connected to the gussets via the crash boxes, wherein a beam portion and each of protrusions overlap each other when viewed along the right-left direction.

5 Claims, 7 Drawing Sheets

BODY OF VEHICLE

CROSS-REFERENCE TO RELATED APPLICATION(S)

This application claims priority to Japanese patent application No. 2020-018256, filed on Feb. 5, 2020, the entire contents of which are incorporated herein by reference.

TECHNICAL FIELD

The technique disclosed herein relates to a body of a vehicle.

BACKGROUND

Japanese Patent Application Publication No. 2011-020627 describes a body of a vehicle. An anti-collision performance against collision is required for the body. In recent years, an anti-collision performance upon when the vehicle collides with an obstacle at a part of its front end, such as upon offset collision or small overlap collision, is required.

SUMMARY

The present disclosure provides a structure of a body which realizes a higher performance against collision.

A body of a vehicle disclosed herein may comprise: a pair of front side members; a crossmember; a pair of gussets, a pair of crash boxes; and a bumper reinforcement. The pair of front side members may extend along a front-rear direction of the vehicle. The crossmember may connect the front side members to each other. The crossmember may comprise a beam portion linearly extending along a right-left direction of the vehicle and first flanges provided at both ends of the beam portion. Each of the first flanges may be joined to an inner lateral surface of corresponding one of the front side members. Each of the gussets may comprise a second flange and a protrusion. Each of the second flanges may be joined to an outer lateral surface of corresponding one of the front side members. Each of the protrusions may protrude outward from corresponding one of the second flanges. Each of the crash boxes may be provided frontward of corresponding one of the protrusions. The bumper reinforcement may extend along the right-left direction of the vehicle, be provided frontward of the crash boxes, and be connected to the gussets via the crash boxes. The beam portion and each of the protrusions may overlap each other when viewed along the right-left direction.

In the present disclosure, "front-rear direction" refers to a direction that extends frontward and rearward of the vehicle, and "right-left direction" refers to a direction that extends rightward and leftward of the vehicle. In the present disclosure, "inner side" refers to an area closer to a center of the vehicle in a vehicle width direction, and "outer side" refers to an area further away from the center of the vehicle in the vehicle width direction.

When the body collides at a part of its front end (at a part of its left or right end), a load is applied to the protrusion of one of the gussets from the bumper reinforcement member via corresponding one of the crash boxes. Then, a load is applied to an outer lateral surface of the corresponding one of the front side members from the aforementioned protrusion. If this front side member is bent inward toward the center of the vehicle due to the load, collision energy cannot be sufficiently absorbed by this front side member. To the contrary, in the body of the present disclosure, the crossmember is disposed between the pair of front side members, and the beam portion and each of the protrusions overlap each other when viewed along the right-left direction. Thus, each of the front side members can be suppressed from being bent by the crossmember receiving the load applied to the front side member from the corresponding one of the protrusions. Due to this, the front side member is prone to collapsing axially, by which the collision energy can be effectively absorbed by the front side member. Due to this, according to the configuration of the body disclosed herein, a high anti-collision performance can be realized.

DETAILED DESCRIPTION

Figure 1:
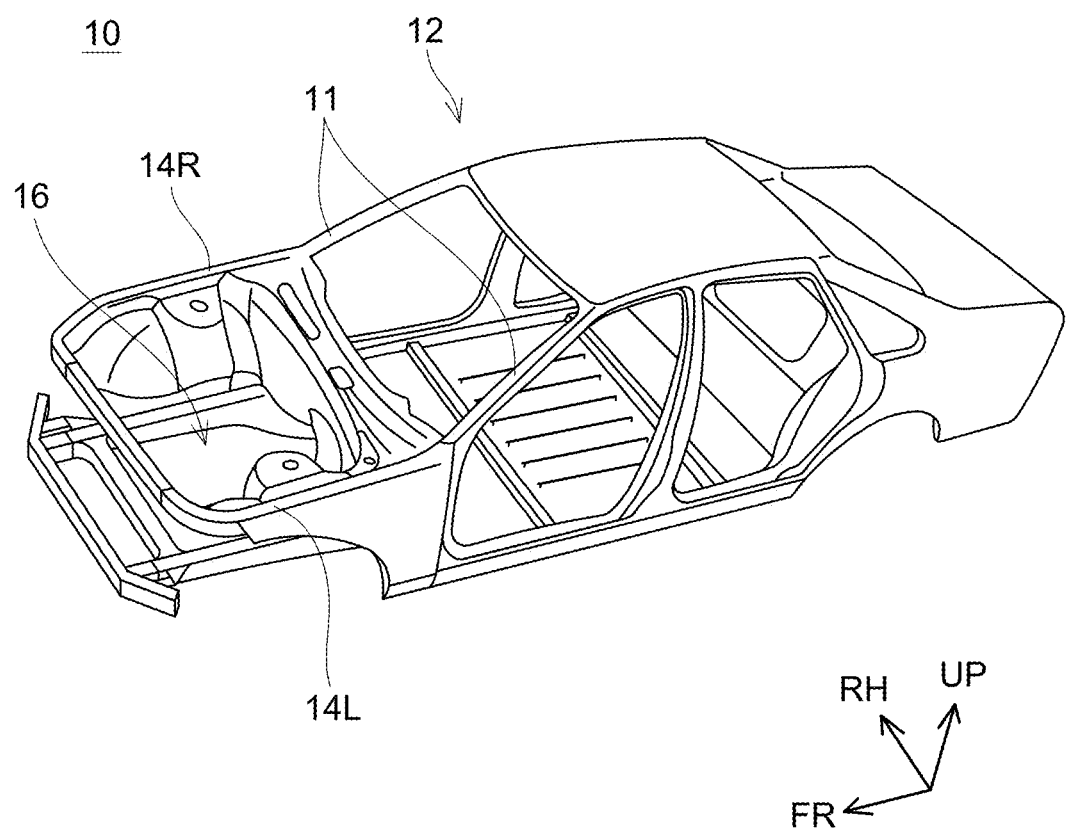
FIG. 1 shows a perspective view of a body of a vehicle.

A traction motor is mounted on an electric vehicle of an embodiment. The vehicle travels by driving wheels with the traction motor. FIG. 1 shows a body 10 of the electric vehicle of the embodiment. In each of the drawings including FIG. 1, an arrow FR indicates a front direction of the vehicle, an arrow RH indicates a right direction of the vehicle, and an arrow UP indicates an up direction of the vehicle. The body 10 includes front pillars 11 and apron upper members 14, each of which (i.e., a right apron upper member 14R and a left apron upper member 14L) extends frontward from corresponding one of the front pillars 11. The body 10 includes a compartment 16 in an area surrounded by the two apron upper members 14. The compartment 16 is disposed frontward of a cabin 12. Although not shown, electric circuit(s) and the like for controlling the traction motor are housed in the compartment 16.

Figure 2:
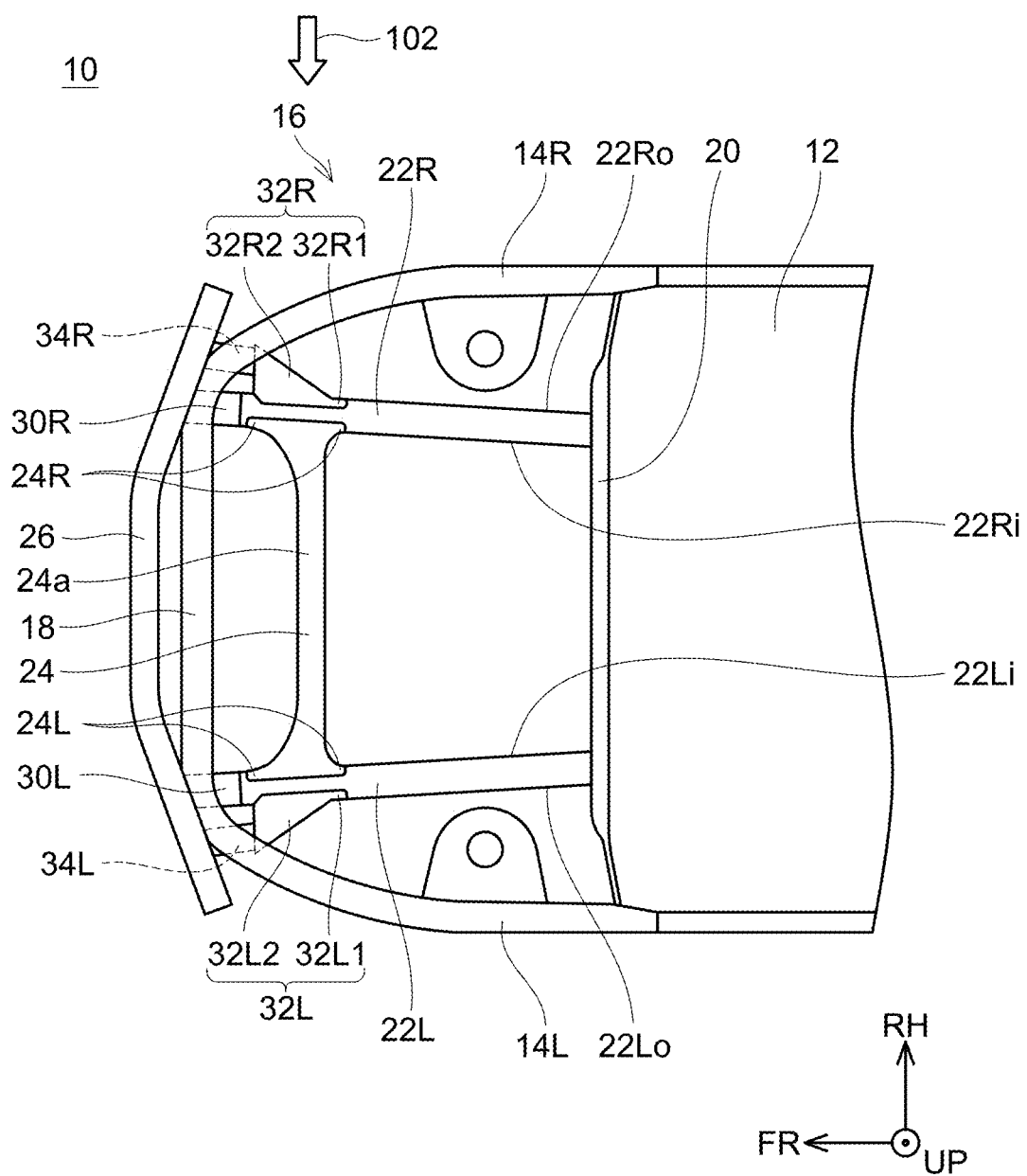
FIG. 2 shows a plan view of a compartment.

FIG. 2 shows an interior of the compartment 16. In FIG. 2, only main members constituting frames of the body 10 are shown, and illustration of other members (e.g., electric circuit(s) and support member(s) thereof disposed in the compartment 16) is omitted. A dash panel 20 is disposed at a rearmost portion of the compartment 16. The dash panel 20 separates the compartment 16 and the cabin 12 from each other. The right apron upper member 14R and the left apron upper member 14L extend along a right edge and a left edge of the compartment 16, respectively. The right apron upper member 14R and the left apron upper member 14L are connected to each other by a core support 18 at a frontmost portion of the body 10. The core support 18 constitutes a front edge of the compartment 16.

A pair of front side members 22 (a right front side member 22R and a left front side member 22L) is disposed in the compartment 16. Each of the front side members 22 extends along a front-rear direction. Each of the front side members 22 is disposed lower than the apron upper members 14R, 14L.

A front crossmember 24 is disposed in the compartment 16. The front crossmember 24 is a member extending along a right-left direction. A right end of the front crossmember 24 is joined to an inner lateral surface 22Ri of the right front side member 22R by welding. A left end of the front crossmember 24 is joined to an inner lateral surface 22Li of the left front side member 22L by welding. The right front side member 22R and the left front side member 22L are connected to each other by the front crossmember 24.

The front crossmember 24 includes a beam portion 24a, a flange 24R disposed at a right end of the beam portion 24a, and a flange 24L disposed at a left end of the beam portion 24a. The beam portion 24a is a portion linearly extending along the right-left direction. The flanges 24R, 24L are portions each having a width larger than the beam portion 24a.

Figure 3:
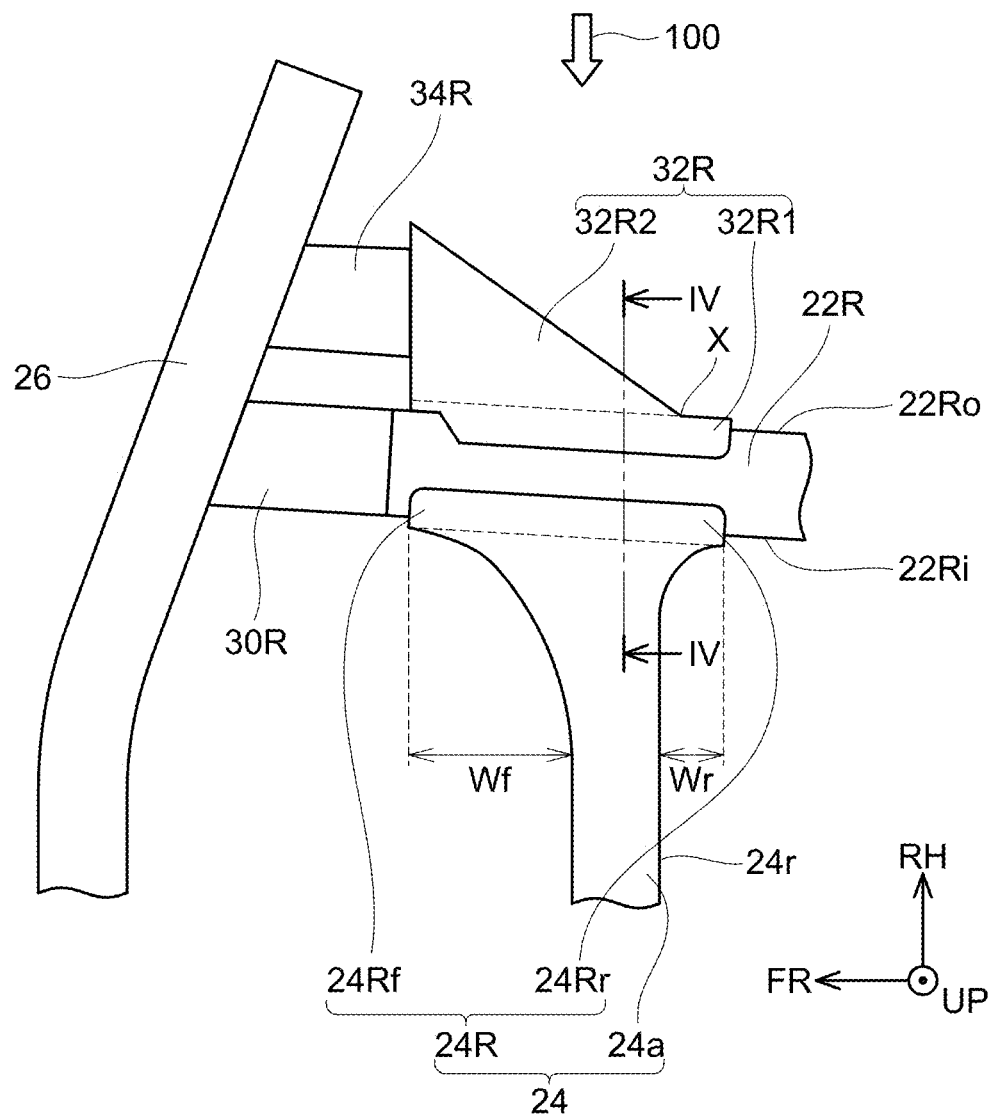
FIG. 3 shows a plan view of a vicinity of a front end of a right front side member.

As shown in FIG. 3, the flange 24R extends along a surface of the right front side member 22R. The flange 24R is joined to the surface of the right front side member 22R including the inner lateral surface 22Ri by welding. The flange 24R includes a front flange 24Rf located frontward of the beam portion 24a and a rear flange 24Rr located rearward of the beam portion 24a. A width Wf of the front flange 24Rf is larger than a width Wr of the rear flange 24Rr. The width Wf is a distance from a front edge of the front flange 24Rf to a front edge of the beam portion 24a (a distance along the front-rear direction), and the width Wr is a distance from a rear edge of the rear flange 24Rr to a rear edge of the beam portion 24a (a distance along the front-rear direction). Since the width Wf is larger than the width Wr, an area in which the front flange 24Rf is welded to the right front side member 22R is greater than an area in which the rear flange 24Rr is welded to the right front side member 22R. As shown in FIG. 2, the flange 24L on the left side is joined to a surface of the left front side member 22L including the inner lateral surface 22Li by welding. The flange 24L on the left side and the flange 24R on the right side are symmetrical, and the flange 24L on the left side has a configuration substantially identical to that of the right flange 24R. In other words, in the left flange 24L as well, a width of a front flange is larger than a width of a rear flange.

As shown in FIG. 2, a right gusset 32R is connected to an outer lateral surface 22Ro of the right front side member 22R. Further, a left gusset 32L is connected to an outer lateral surface 22Lo of the left front side member 22L.

As shown in FIG. 3, the right gusset 32R includes a flange 32R1 and a protrusion 32R2. The flange 32R1 and the protrusion 32R2 are constituted of one steel sheet. The flange 32R1 extends along the surface of the right front side member 22R. The flange 32R1 is joined to the surface of the right front side member 22R including the outer lateral surface 22Ro by welding. The protrusion 32R2 protrudes outward from the flange 32R1. When viewed from above, the protrusion 32R2 has a triangular shape of which width reduces from a front side toward a rear side. The right gusset 32R is joined to the outer lateral surface 22Ro of the right front side member 22R at a position opposite to a portion where the front crossmember 24 is joined to the inner lateral surface 22Ri of the right front side member 22R. When the body 10 is viewed along the right-left direction as shown by an arrow 100 of FIG. 3, the protrusion 32R2 of the right gusset 32R and the beam portion 24a of the front crossmember 24 overlap each other. Further, as shown in FIG. 2, the left gusset 32L and the right gusset 32R are symmetrical, and the left gusset 32L has a configuration substantially similar to the above-described configuration of the right gusset 32R. Due to this, when the body 10 is viewed along the right-left direction as shown by an arrow 102 of FIG. 2, the protrusion 32R2 of the right gusset 32R, the beam portion 24a of the front crossmember 24, and the protrusion 32L2 of the left gusset 32L are disposed to overlap one another.

As shown in FIG. 2, a crash box 34R is joined to a front edge of the right gusset 32R. A crash box 34L is joined to a front edge of the left gusset 32L. A crash box 30R is joined to a front edge of the right front side member 22R. A crash box 30L is joined to a front edge of the left front side member 22L. The crash boxes 34R, 34L, 30R, 30L are box-shaped members constituted of metal and each have a strength lower than respective strengths of the front side members 22R, 22L, the gussets 32R, 32L, and the front crossmember 24.

A bumper reinforcement 26 is disposed at a frontmost part of the body 10. The bumper reinforcement 26 is a member extending in the right-left direction. The bumper reinforcement 26 is disposed frontward of the crash boxes 30R, 30L, 34R, 34L. The bumper reinforcement 26 is joined to respective front edges of the crash boxes 30R, 30L, 34R, 34L. The bumper reinforcement 26 is coupled to the right front side member 22R via the crash box 30R. The bumper reinforcement 26 is coupled to the left front side member 22L via the crash box 30L. The bumper reinforcement 26 is coupled to the right gusset 32R via the crash box 34R. The bumper reinforcement 26 is coupled to the left gusset 32L via the crash box 34L.

Figure 4:
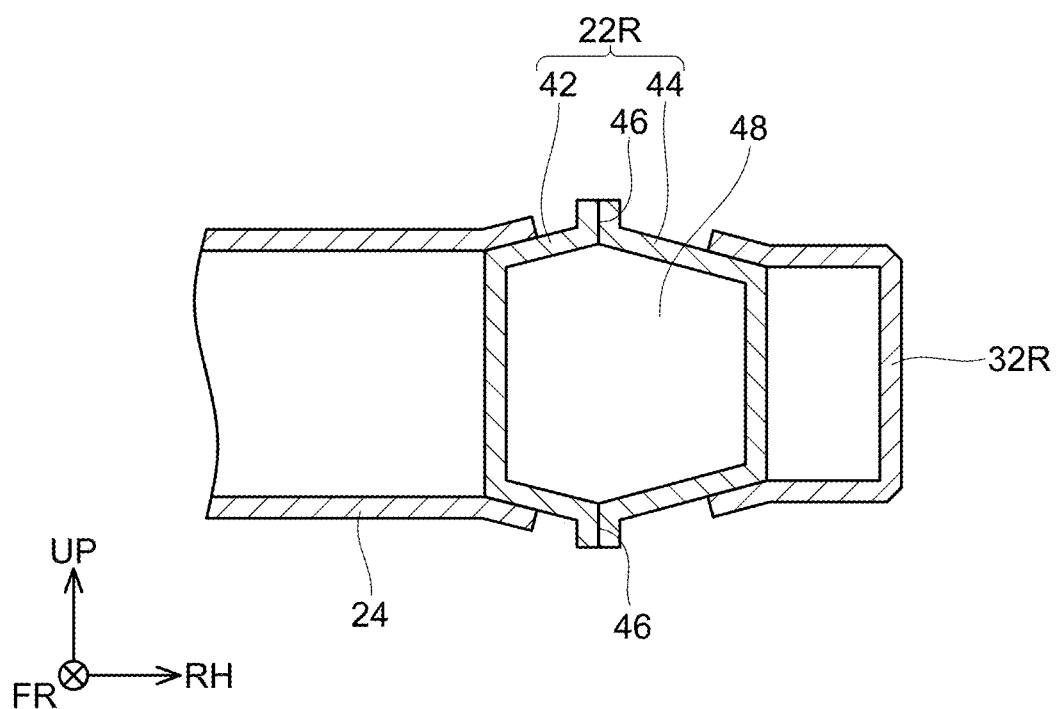
FIG. 4 shows a cross-sectional view taken along a line IV-IV in FIG. 3.

FIG. 4 shows a cross-sectional view taken along a line IV-IV of FIG. 3. In other words, FIG. 4 shows a cross section perpendicular to the front-rear direction. As shown in FIG. 4, the right front side member 22R has a configuration in which two steel plates 42, 44 are joined to each other at a connecting portion 46. Illustration of the connecting portion 46 is omitted in the drawings except for FIG. 4. The steel plates 42, 44 are elongated members of which cross sections are substantially U-shaped. The steel plates 42, 44 are joined to each other, by which the right front side member 22R is configured. Thus, the right front side member 22R is an elongated polygonal member and has a space 48 therein.

Figure 5:
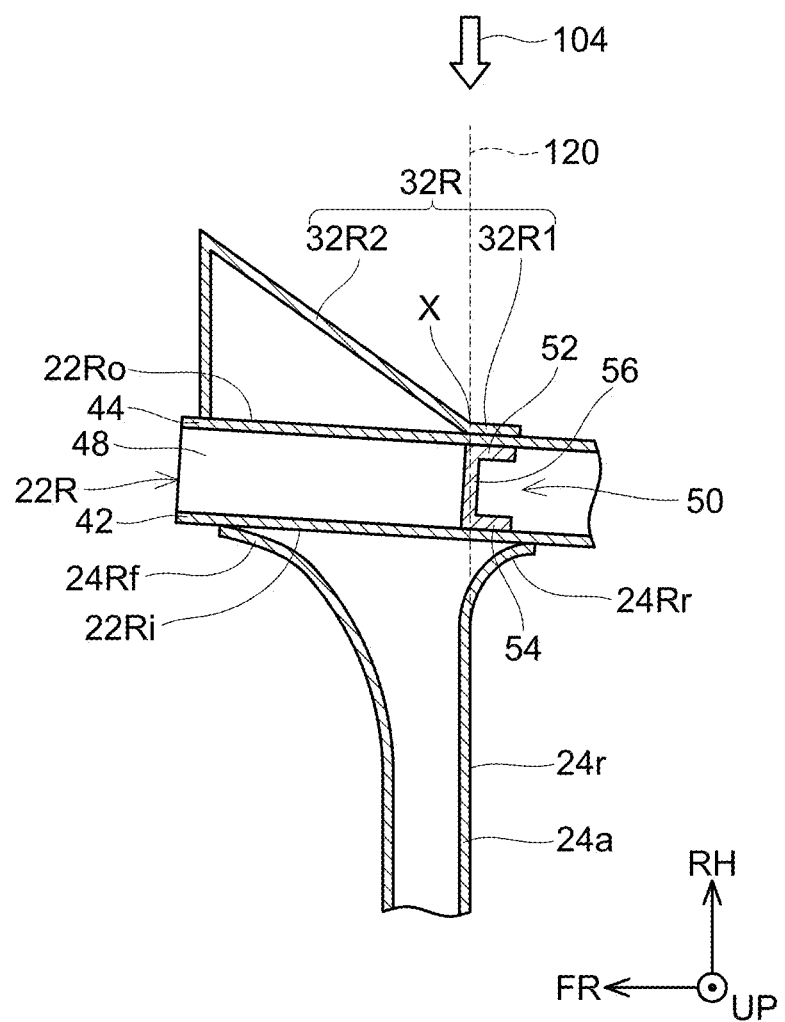
FIG. 5 shows a horizontal cross-sectional view of the vicinity of the front end of the right front side member.

FIG. 5 shows a cross-sectional view in which the connecting portion between the right front side member 22R, the right gusset 32R, and the front crossmember 24 is cut along a horizontal surface. As shown in FIG. 5, a reinforcement 50 is provided in the space 48 in the right front side member 22R. The reinforcement 50 includes flanges 52, 54, and a main plate 56. The flanges 52, 54 respectively extend along an outer wall of the right front side member 22R (i.e., the steel plates 42, 44). The flange 52 is joined to the steel plate 44 at a portion which constitutes the outer lateral surface 22Ro of the right front side member 22R by welding. The flange 54 is joined to the steel plate 42 at a portion which constitutes the inner lateral surface 22Ri of the right front side member 22R by welding. In other words, the flange 52 is joined to a part of the outer wall of the right front side member 22R, and the flange 54 is joined to a part of the outer wall which opposes the connecting portion across the space 48. The main plate 56 connects the flange 52 and the flange 54 to one another. The main plate 56 completely closes the space 48. The main plate 56 is positioned between the protrusion 32R2 of the right gusset 32R and the beam portion 24a of the front crossmember 24. Due to this, the protrusion 32R2 of the right gusset 32R, the beam portion 24a of the front crossmember 24, and the reinforcement 50 overlap one another when the body 10 is viewed along the right-left direction as shown by an arrow 104. A broken line 120 of FIG. 5 illustrates a position of a rear edge 24r of the beam portion 24*a* in the front-rear direction. As shown in the broken line 120, in the front-rear direction, a position of the rear edge 24*r* of the beam portion 24*a* substantially matches a position of a rear edge X of the protrusion 32R2 of the right gusset 32R. Further, the main plate 56 of the reinforcement 50 is disposed to overlap the position of the rear edge 24*r* of the beam portion 24*a* and the position of the rear edge X of the protrusion 32R2 in the front-rear direction. Thus, the rear edge X of the protrusion 32R2 overlaps the main plate 56 when the body 10 is viewed along the right-left direction as shown by the arrow 104. Further, the rear edge 24*r* of the beam portion 24*a* (i.e., a part of the steel plate which constitutes the rear edge 24*r*) overlaps the main plate 56 when the body 10 is viewed along the right-left direction as shown by the arrow 104. Although not shown, similar to the right front side member 22R, the left front side member 22L includes the reinforcement 50. The left front side member 22L and the right front side member 22R in the right-left direction are symmetrical, and the left front side member 22L has a configuration substantially identical to that of the right front side member 22R. Due to this, when the body 10 is viewed along the right-left direction as shown by the arrow 102 of FIG. 2, the rear edge of the protrusion 32R2 of the right gusset 32R overlaps the main plate 56 on the right side and the rear edge of the protrusion 32L2 of the left gusset 32L overlap the main plate 56 on the left side. Further, when the body 10 is viewed along the right-left direction as shown by the arrow 102 of FIG. 2, a steel plate that constitutes the rear edge of the beam portion 24*a* of the front crossmember 24 is disposed to overlap the main plate 56 on the right side and the main plate 56 on the left side.

Figure 6:
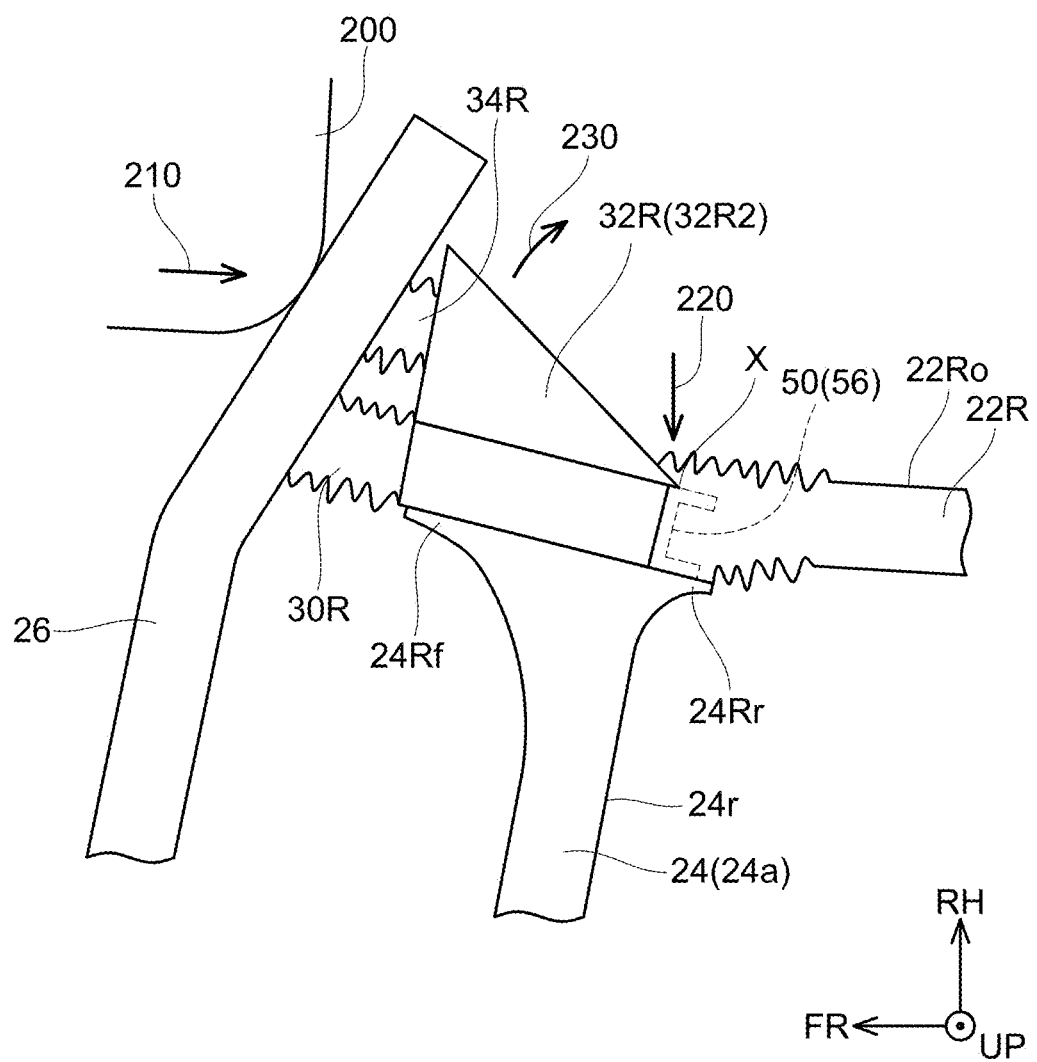
FIG. 6 shows deformation of the body of the vehicle of an embodiment upon small overlap collision.
Figure 7:
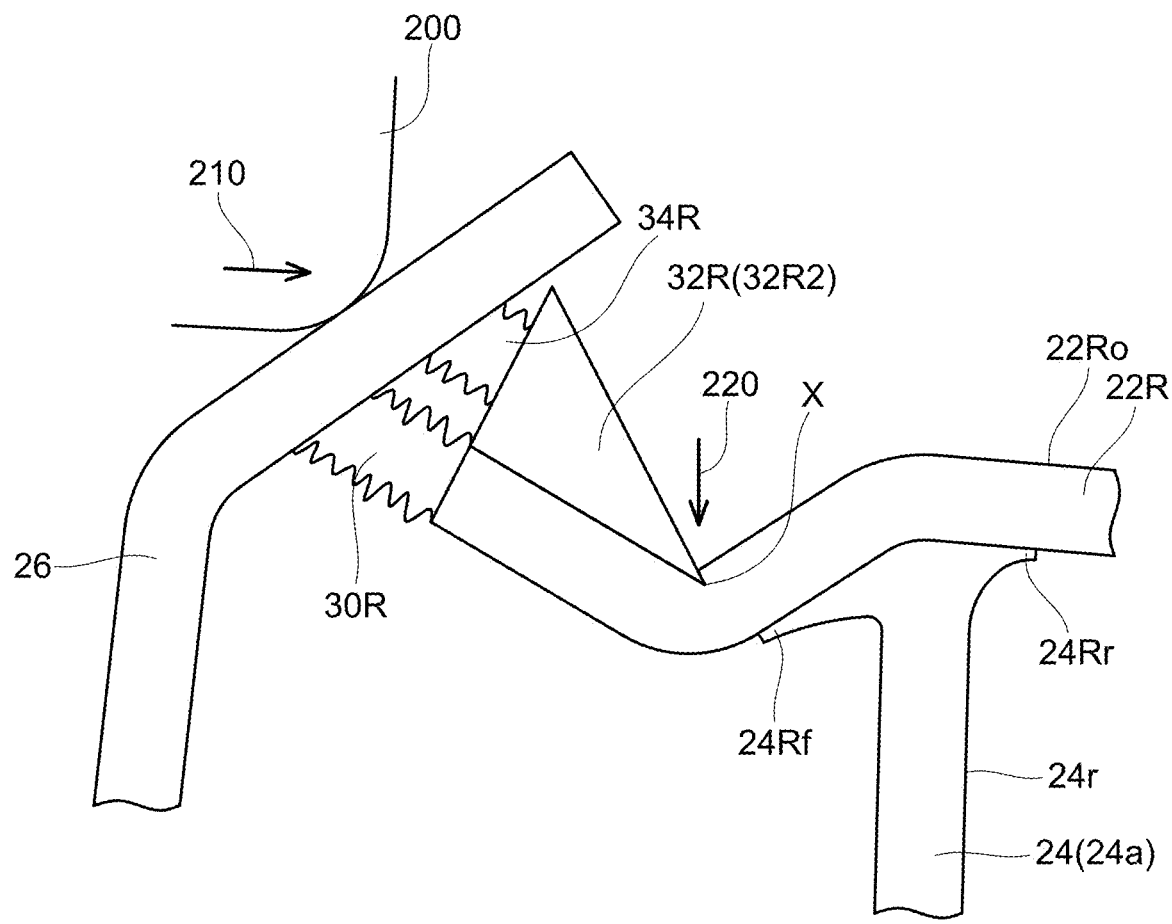
FIG. 7 shows deformation of a body of a vehicle of a comparative example upon small overlap collision.
Figure 7:
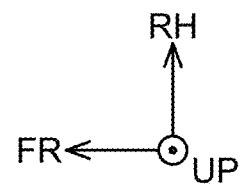

FIG. 6 shows a case where the body 10 of the embodiment undergoes small overlap collision. Further, FIG. 7 shows a case where a body of a comparative example undergoes small overlap collision. In the body of the comparative example shown in FIG. 7, the front crossmember 24 is disposed rearward of the right gusset 32R and the left gusset 32L. In regard to other aspects, a configuration of the body of the comparative example is identical to a configuration of the body 10 of the embodiment. Both of FIGS. 6, 7 show cases where a front-right end of the body (a right portion of the bumper reinforcement 26) collides with a barrier 200. In both cases of FIGS. 6, 7, a load 210 is applied rearward to the right portion of the bumper reinforcement 26 from the barrier 200. Due to this, the crash boxes 30R, 34R are collapsed, and load is applied rearward to the protrusion 32R2 of the right gusset 32R. Since the protrusion 32R2 protrudes outward from the outer lateral surface 22Ro of the right front side member 22R, a load 220 is applied inward to the rear edge X of the protrusion 32R2 (toward a center in a width direction of the body) when the load is applied rearward to the protrusion 32R2.

As shown in FIG. 7, in the body of the comparative example, since the front crossmember 24 is disposed rearward of the right gusset 32R, the load 220 applied to the rear edge X of the protrusion 32R2 is barely transferred to the front crossmember 24. Due to this, when the load 220 is applied, the right front side member 22R is bent inward at the position of the rear edge X. When the right front side member 22R is bent as such, the load is not applied to the right front side member 22R in an axial direction thereof, thus collision energy cannot be sufficiently absorbed by the right front side member 22R.

To the contrary, as shown in FIG. 6, when the body 10 of the embodiment is viewed along the right-left direction, the beam portion 24*a* of the right front side member 22R and the protrusion 32R2 of the right gusset 32R overlap each other. Due to this, the load 220 applied to the rear edge X of the protrusion 32R2 is easily transferred to the beam portion 24*a*. Since the beam portion 24*a* can receive the load 220, the right front side member 22R can be suppressed from being bent inward at the position of the rear edge X. Thus, the load 210 applied to the bumper reinforcement 26 is easily transferred to the right front side member 22R in the axial direction thereof. When the load 210 is transferred to the right front side member 22R in the axial direction thereof, the right front side member 22R is axially collapsed as shown in FIG. 6. As such, due to the right front side member 22R being axially collapsed, the right front side member 22R can effectively absorb the collision energy.

In the body 10 of the embodiment in particular, the reinforcement 50 is disposed in the right front side member 22R, and the beam portion 24*a*, the protrusion 32R2, and the reinforcement 50 are disposed to overlap each other when the body 10 is viewed along the right-left direction. Due to this, the load 220 is easily transferred to the front crossmember 24 via the reinforcement 50. Further, the rear edge X of the protrusion 32R2 and the main plate 56 of the reinforcement 50 are disposed to overlap each other when viewed along the right-left direction. Due to this, the load 220 is easily transferred to the beam portion 24*a* via the main plate 56. Further, the rear edge 24*r* of the beam portion 24*a* and the main plate 56 of the reinforcement 50 are disposed to overlap each other when viewed along the right-left direction. Due to this, the load 220 is easily transferred to the steel plate constituting the rear edge 24*r* of the beam portion 24*a* via the main plate 56. As such, in the body 10 of the embodiment, the load 220 is effectively transferred to the beam portion 24*a* of the front crossmember 24. Due to this, the right front side member 22R can suitably be supported by the front crossmember 24 at a position to which the load 220 is applied (i.e., the position of the rear edge X). Thus, the right front side member 22R can suitably be suppressed from being bent inward.

When the small overlap collision occurs as shown in FIG. 6, a moment load 230 is applied to the protrusion 32R2 with the rear edge X thereof being a point of fulcrum. When the moment load 230 is applied to the protrusion 32R2 as such, a load is applied to a joint surface (a welding portion) between the front flange 24Rf of the front crossmember 24 and the right front side member 22R in a direction separating the joint surface. If the right front side member 22R is separated away from the front flange 24Rf, the front crossmember 24 cannot effectively receive the load 220. To the contrary, in the body 10 of the embodiment, a width of the front flange 24Rf of the front crossmember 24 is larger than a width of the rear flange 24Rr of the front crossmember 24. In other words, the joint surface (the welding portion) between the front flange 24Rf and the right front side member 22R is configured to be wider. Due to this, a strength of this joint surface is high, thus the right front side member 22R is resistant against separating away from the front flange 24Rf. As such, according to this configuration, the right front side member 22R can be suitably supported by the front crossmember 24, and the right front side member 22R can suitably be suppressed from being bent inward.

As described above, according to the body 10 of the embodiment, the right front side member 22R can be suppressed from being bent inward upon the small overlap collision. As such, according to the body 10 of the embodiment, the collision energy can be effectively absorbed by the right front side member 22R being axially collapsed upon small overlap collision. Thus, the body 10 of the embodiment has a high anti-collision performance.

Although the small overlap collision at the front-right end of the body 10 is described in FIG. 6, the left front side member 22L can also be prevented from being bent inward in small overlap collision at the front-left end of the body 10 as well. As such, the collision energy can be effectively absorbed by the left front side member 22L being axially collapsed.

In the above-described embodiment, in the front-rear direction, the position of the rear edge 24r of the beam portion 24a and respective positions of the rear edge X of the protrusions 32R2, 32L2 substantially match each other. However, the beam portion 24a and the protrusions 32R2, 32L2 may at least partially overlap each other when viewed along the right-left direction. When these members at least partially overlap each other, a load can effectively be transferred from the protrusions 32R2, 32L2 to the beam portion 24a. Further, in the body, respective connections between members may be joined by welding, or joined by fastening with bolt(s).

Although the above-described embodiment is described about an electric vehicle, a configuration of the body of the embodiment may be employed to an engine-powered vehicle, a hybrid vehicle, a fuel cell vehicle, and the like. It should be noted that since an engine is not included in a compartment of the electric vehicle and the fuel cell vehicle, a front crossmember and the like may easily be disposed in the compartment thereof.

A relationship between components of the embodiment described above and components of the claims will be described. The flanges 24R, 24L of the embodiment are examples of first flanges of the claims. The flanges 32R1, 32L1 of the embodiment are examples of second flanges of the claims. The flanges 52, 54 of the embodiment are examples of third flanges of the claims. The crash boxes 34R, 34L are examples of crash boxes of the claims.

Some of the technical elements disclosed herein will be listed below. It should be noted that the respective technical elements are independent of one another, and are useful solely or in combinations.

In an aspect of the configuration disclosed herein, when viewed in a cross-section perpendicular to the front-rear direction, each of the front side members may comprise an outer wall and a space defined by the outer wall. Each of the front side members may comprise a reinforcement provided in the space and joined to the outer wall. The beam portion, each of the protrusions, and the corresponding one of the reinforcements may overlap each other when viewed along the right-left direction.

With such a configuration, a load is easily transferred to the beam portion of the crossmember from the protrusion of the gusset via the reinforcement. As such, the load is easily received by the crossmember, and the front side member can effectively be suppressed from being bent.

In an aspect of the configuration disclosed herein, each of the reinforcements may comprise a pair of third flanges and a main plate connecting the third flanges to each other. In each of the reinforcements, one of the third flanges may be joined to one part of the outer wall and another of the third flanges may be joined to another part of the outer wall facing the one part of the outer wall across the space. In this case, a rear edge of each of the protrusions may overlap corresponding one of the main plates when viewed along the right-left direction. Further, in this case, a portion of an outer wall of the beam portion located on a rear edge of the beam portion may overlap the main plates when viewed along the right-left direction.

With such a configuration, a load is easily received by the crossmember, and the front side member can effectively be suppressed from being bent.

In an aspect of the configuration disclosed herein, each of the first flanges may comprise a front flange provided frontward of the beam portion and a rear flange provided rearward of the beam portion. In each of the first flanges, a distance from a front edge of the front flange to a front edge of the beam portion may be longer than a distance from a rear edge of the rear flange to a rear edge of the beam portion.

When a load is applied to the protrusion of the gusset by collision, the load is applied in a direction separating the front flange away from the front side member. According to the above configuration, an area of a connecting portion between the front flange and the front side member can be increased by making the front flange longer. Due to this, the front flange can be suppressed from being separated away from the front side member.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A body of a vehicle, comprising:
   a pair of front side members extending along a front-rear direction of the vehicle;
   a crossmember connecting the front side members to each other and comprising a beam portion linearly extending along a right-left direction of the vehicle and first flanges provided at both ends of the beam portion, each of the first flanges being joined to an inner lateral surface of corresponding one of the front side members;
   a pair of gussets, each of the gussets comprising a second flange and a protrusion, each of the second flanges being joined to an outer lateral surface of corresponding one of the front side members, each of the protrusions protruding outward from corresponding one of the second flanges;
   a pair of crash boxes, each of the crash boxes being provided frontward of corresponding one of the protrusions; and
   a bumper reinforcement extending along the right-left direction of the vehicle, provided frontward of the crash boxes, and connected to the gussets via the crash boxes,
   wherein the beam portion and each of the protrusions overlap each other when viewed along the right-left direction, wherein
   when viewed in a cross-section perpendicular to the front-rear direction, each of the front side members comprises an outer wall and a space defined by the outer wall; and each of the front side members comprises a reinforcement provided in the space and joined to the outer wall, wherein the beam portion, each of the protrusions, and the corresponding one of the reinforcements overlap each other when viewed along the right-left direction.

2. The body of claim 1, wherein each of the reinforcements comprises a pair of third flanges and a main plate connecting the third flanges to each other, and in each of the reinforcements, one of the third flanges is joined to one part of the outer wall and another of the third flanges is joined to another part of the outer wall facing the one part of the outer wall across the space.

3. The body of claim 2, wherein a rear edge of each of the protrusions overlaps corresponding one of the main plates when viewed along the right-left direction.

4. The body of claim 2, wherein a portion of an outer wall of the beam portion located on a rear edge of the beam portion overlaps the main plates when viewed along the right-left direction.

5. A body of a vehicle, comprising:

a pair of front side members extending along a front-rear direction of the vehicle;

a crossmember connecting the front side members to each other and comprising a beam portion linearly extending along a right-left direction of the vehicle and first flanges provided at both ends of the beam portion, each of the first flanges being joined to an inner lateral surface of corresponding one of the front side members;

a pair of gussets, each of the gussets comprising a second flange and a protrusion, each of the second flanges being joined to an outer lateral surface of corresponding one of the front side members, each of the protrusions protruding outward from corresponding one of the second flanges;

a pair of crash boxes, each of the crash boxes being provided frontward of corresponding one of the protrusions; and a bumper reinforcement extending along the right-left direction of the vehicle, provided frontward of the crash boxes, and connected to the gussets via the crash boxes, wherein the beam portion and each of the protrusions overlap each other when viewed along the right-left direction, wherein each of the first flanges comprises a front flange provided frontward of the beam portion and a rear flange provided rearward of the beam portion, and in each of the first flanges, a distance from a front edge of the front flange to a front edge of the beam portion is longer than a distance from a rear edge of the rear flange to a rear edge of the beam portion.

* * * * *